US010294413B2

(12) United States Patent
Roper et al.

(10) Patent No.: US 10,294,413 B2
(45) Date of Patent: May 21, 2019

(54) LIGHTWEIGHT PROPPANT AND METHODS FOR MAKING AND USING SAME

(71) Applicant: CARBO Ceramics Inc., Houston, TX (US)

(72) Inventors: Todd Roper, Katy, TX (US); Thu Lieng, Richmond, TX (US); Olatunji Orekha, Houston, TX (US); William Scott Woolfolk, Maurice, LA (US)

(73) Assignee: CARBO Ceramics Inc., Houston, TX (US)

( * ) Notice: Subject to any disclaimer, the term of this patent is extended or adjusted under 35 U.S.C. 154(b) by 311 days.

(21) Appl. No.: 14/950,649

(22) Filed: Nov. 24, 2015

(65) Prior Publication Data
US 2017/0145301 A1 May 25, 2017

(51) Int. Cl.
C09K 8/80 (2006.01)
E21B 43/26 (2006.01)
E21B 43/267 (2006.01)
E21B 43/04 (2006.01)

(52) U.S. Cl.
CPC .............. C09K 8/805 (2013.01); E21B 43/26 (2013.01); E21B 43/267 (2013.01); E21B 43/04 (2013.01)

(58) Field of Classification Search
None
See application file for complete search history.

(56) References Cited

U.S. PATENT DOCUMENTS

| 4,585,064 | A | 4/1986 | Graham et al. |
| 4,717,594 | A | 1/1988 | Graham et al. |
| 4,869,960 | A | 9/1989 | Gibb et al. |
| 4,888,240 | A | 12/1989 | Graham et al. |
| 5,422,183 | A | 6/1995 | Sinclair et al. |
| 6,772,838 | B2 | 8/2004 | Dawson et al. |
| 7,153,575 | B2 | 12/2006 | Anderson et al. |
| 7,270,879 | B2 | 9/2007 | McCrary |
| 7,971,643 | B2 | 7/2011 | Brannon et al. |
| 8,796,188 | B2 | 8/2014 | Pisklak et al. |
| 9,045,678 | B2 | 6/2015 | Rediger |
| 2005/0244641 | A1 | 11/2005 | Vincent |
| 2010/0179077 | A1* | 7/2010 | Turakhia ............... C09K 8/805 507/220 |
| 2011/0118155 | A1 | 5/2011 | Pisklak et al. |
| 2011/0120719 | A1* | 5/2011 | Soane ..................... C09K 8/94 166/308.1 |
| 2017/0145300 | A1 | 5/2017 | Lu et al. |

OTHER PUBLICATIONS

International Search Report and Written Opinion for International Application No. PCT/US2016/061832 dated Jan. 19, 2017.

* cited by examiner

Primary Examiner — Jeffrey D Washville
(74) Attorney, Agent, or Firm — Patterson + Sheridan, LLP

(57) ABSTRACT

Lightweight proppant particles are disclosed. The lightweight proppant particle can include a proppant particle having an apparent specific gravity of at least about 1.5 g/cc, a coating of a hydrophobic material formed on an outer surface of the proppant particle, and a coating of an amphiphilic material formed on an outer surface of the coating of the hydrophobic material.

20 Claims, No Drawings

LIGHTWEIGHT PROPPANT AND METHODS FOR MAKING AND USING SAME

FIELD

Embodiments of the present invention relate generally to hydraulic fracturing of geological formations, and more particularly to proppants used in the hydraulic fracture stimulation of oil and gas reservoirs.

BACKGROUND

In order to stimulate and more effectively produce hydrocarbons from downhole formations, especially formations with low porosity and/or low permeability, induced fracturing (called "frac operations", "hydraulic fracturing", or simply "fracing") of the hydrocarbon-bearing formations has been a commonly used technique. In a typical frac operation, fluids are pumped downhole under high pressure, causing the formations to fracture around the borehole, creating high permeability conduits that promote the flow of the hydrocarbons into the borehole. These frac operations can be conducted in horizontal and deviated, as well as vertical, boreholes, and in either intervals of uncased wells, or in cased wells through perforations.

In cased boreholes in vertical wells, for example, the high pressure fluids exit the borehole via perforations through the casing and surrounding cement, and cause the formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures. Normally, if the fluid, sometimes called slurry, pumped downhole does not contain solids that remain lodged in the fracture when the fluid pressure is relaxed, then the fracture re-closes, and most of the permeability conduit gain is lost.

These solids, called proppants, are generally composed of sand grains or ceramic particles, and the fluid used to pump these solids downhole is usually designed to be sufficiently viscous such that the proppant particles remain entrained in the fluid as it moves downhole and out into the induced fractures. Prior to producing the fractured formations, materials called "breakers" can be pumped downhole in the frac fluid slurry to reduce the viscosity of the frac fluid after a desired time delay to enable these fluids to be removed from the fractures during production. However, the cross-linked polymers can still accumulate in the fracture, thereby reducing the permeability of gas or oil through the fracture.

There is a need, therefore, for proppant particles that can be entrained in a fracturing fluid without the need for viscous cross-linked polymers that can accumulate in the fracture.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

Described herein are proppant compositions having hydrophobic properties. In particular, proppant particles containing a hydrophobic material are described herein. Also described herein are methods for making proppant having hydrophobic and hydrophilic properties. In particular, methods of infusing a hydrophobic material into an internal porosity of the proppant particles are described herein. Also described herein are methods of using proppant compositions having hydrophobic properties. In particular, methods of hydraulic fracturing, frac-packing, and/or gravel packing with proppant particles containing a hydrophobic material are described herein.

The proppant compositions disclosed herein can be or include lightweight proppant. The lightweight proppant can have a hydrophobic component. In one or more exemplary embodiments, the lightweight proppant can have a hydrophobic component and an amphiphilic component. For example, the lightweight proppant can include a proppant particle treated with a hydrophobic material and having one or more coatings of an amphiphilic material on an outer surface thereof.

In one or more exemplary embodiments, the proppant particle has an internal porosity that is at least partially infused with the hydrophobic material. For example, the internal porous structure of the proppant particle can be at least partially treated with the hydrophobic material and the outer surface of the proppant particle can be at least partially coated with the amphiphilic material. In one or more exemplary embodiments, the hydrophobic treatment and the amphiphilic coating are both fluid permeable. In one or more exemplary embodiments, the hydrophobic treatment and the amphiphilic coating do not trap air within the porous structure of the proppant particle. The hydrophobic treatment can be or include any modification of a surface tension of the proppant with water that results in decreasing a surface energy of one or more ceramic channels of the internal porous structure of the proppant particle, resulting in repelling of water from the channels.

In one or more exemplary embodiments, the hydrophobic material can be or include any suitable material having hydrophobic properties. The hydrophobic material can be or include any silicon containing compound, including silicone materials, silanes, and siloxanes, fluorinated organic compounds, polytetrafluoroethylene (commonly known as Teflon™), plant oils, such as linseed oil, soybean oil, corn oil, cottonseed oil, vegetable oil (widely commercially available such as Crisco®), and canola oil, hydrocarbons, such as kerosene, diesel, and crude oil, petroleum distillates, such as hydrocarbon liquids comprising a mixture of $C_7$-$C_{12}$ aliphatic and alicyclic hydrocarbons and aromatic hydrocarbons ($C_7$-$C_{12}$), commonly known as Stoddard Solvent, aliphatic solvents, solvent naphtha (medium aliphatic and light aromatic), and paraffin, such as solvent dewaxed heavy paraffinic petroleum distillate and stearates, such as calcium stearate. The hydrophobic material can also be or include any one or more polymers or copolymers of acrylates, meth(acrylates), urethanes, epoxies, amides, imides, esters, one or more ethers, olefins, fluorocarbons, and styrenic monomers. The one or more polymers or copolymers can be or include any suitable fluorinated polymers or copolymers. In one or more exemplary embodiments, the hydrophobic material can be or include one or more poly dialkyl siloxanes, such as polydimethylsiloxane (PDMS), one or more organosilanes, such as tetraalkoxysilane and trialkoxysilane, one or more fluorinated siloxanes, one or more fluorinated urethanes, and one or more fluorinated silanes. In one or more exemplary embodiments, the hydrophobic material is PDMS. The PDMS can include modified PDMS, such as minopropyl terminated PDMS, hydroxyl terminated PDMS, acrylate terminated PDMS, methacylate terminated PDMS, silanol terminated PDMS, silane terminated PDMS, and vinyl terminated PDMS.

The hydrophobic material can have any suitable degree of hydrophobicity (water repellency). In one or more exemplary embodiments, the outer surface of the hydrophobic material has a hydrophobicity value as measured by a water droplet contact angle of at least about 90°, at least about 100°, at least about 110°, at least about 120°, at least about 130°, or at least about 150°.

The lightweight proppant can include any suitable concentration of hydrophobic material. In one or more exemplary embodiments, the lightweight proppant has a hydrophobic material concentration of at least about 0.01 wt %, at least about 0.05 wt %, at least about 0.1 wt %, at least about 0.25 wt %, at least about 0.5 wt %, at least about 0.75 wt %, or at least about 1 wt %, based on the weight of the lightweight proppant particle. In one or more exemplary embodiments, the lightweight proppant has a hydrophobic material concentration of less than 5 wt %, less than 3 wt %, less than 2 wt %, less than 1.5 wt %, or less than 1 wt %, based on the weight of the lightweight proppant particle. The lightweight proppant can have a hydrophobic material concentration from about 0.02 wt %, about 0.08 wt %, about 0.15 wt %, about 0.3 wt %, or about 0.6 wt % to about 0.7 wt %, about 0.8 wt %, about 0.9 wt %, about 1 wt %, about 1.25 wt %, about 1.5 wt %, or about 2 wt % or more based on the weight of the lightweight proppant particle.

According to several exemplary embodiments, the amphiphilic coating can be or include any one or more resin materials, epoxy resin materials, waxes, polyolefins, poly (lactic acids), styrenic polymers, or other polymeric materials. According to several exemplary embodiments, the resin material includes any suitable resin capable of being coated onto a proppant particle. For example, the resin material can include a phenolic resin, such as a phenol-formaldehyde resin.

According to several exemplary embodiments, the phenol-formaldehyde resin has a molar ratio of formaldehyde to phenol (F:P) from a low of about 0.6:1, about 0.9:1, or about 1.2:1 to a high of about 1.9:1, about 2.1:1, about 2.3:1, or about 2.8:1. For example, the phenol-formaldehyde resin can have a molar ratio of formaldehyde to phenol of about 0.7:1 to about 2.7:1, about 0.8:1 to about 2.5:1, about 1:1 to about 2.4:1, about 1.1:1 to about 2.6:1, or about 1.3:1 to about 2:1. The phenol-formaldehyde resin can also have a molar ratio of formaldehyde to phenol of about 0.8:1 to about 0.9:1, about 0.9:1 to about 1:1, about 1:1 to about 1.1:1, about 1.1:1 to about 1.2:1, about 1.2:1 to about 1.3:1, or about 1.3:1 to about 1.4:1.

According to several exemplary embodiments, the phenol-formaldehyde resin has a molar ratio of less than 1:1, less than 0.9:1, less than 0.8:1, less than 0.7:1, less than 0.6:1, or less than 0.5:1. For example, the phenol-formaldehyde resin can be or include a phenolic novolac resin. Phenolic novolac resins are well known to those of ordinary skill in the art, for instance see U.S. Pat. No. 2,675,335 to Rankin, U.S. Pat. No. 4,179,429 to Hanauye, U.S. Pat. No. 5,218,038 to Johnson, and U.S. Pat. No. 8,399,597 to Pullichola, the entire disclosures of which are incorporated herein by reference. Suitable examples of commercially available novolac resins include novolac resins available from Plenco™, Durite® resins available from Momentive, and novolac resins available from S.I. Group.

According to several exemplary embodiments, the phenol-formaldehyde resin has a weight average molecular weight from a low of about 200, about 300, or about 400 to a high of about 1,000, about 2,000, or about 6,000. For example, the phenol-formaldehyde resin can have a weight average molecular weight from about 250 to about 450, about 450 to about 550, about 550 to about 950, about 950 to about 1,500, about 1,500 to about 3,500, or about 3,500 to about 6,000. The phenol-formaldehyde resin can also have a weight average molecular weight of about 175 to about 800, about 700 to about 3,330, about 1,100 to about 4,200, about 230 to about 550, about 425 to about 875, or about 2,750 to about 4,500.

According to several exemplary embodiments, the phenol-formaldehyde resin has a number average molecular weight from a low of about 200, about 300, or about 400 to a high of about 1,000, about 2,000, or about 6,000. For example, the phenol-formaldehyde resin can have a number average molecular weight from about 250 to about 450, about 450 to about 550, about 550 to about 950, about 950 to about 1,500, about 1,500 to about 3,500, or about 3,500 to about 6,000. The phenol-formaldehyde resin can also have a number average molecular weight of about 175 to about 800, about 700 to about 3,000, about 1,100 to about 2,200, about 230 to about 550, about 425 to about 875, or about 2,000 to about 2,750.

According to several exemplary embodiments, the phenol-formaldehyde resin has a z-average molecular weight from a low of about 200, about 300, or about 400 to a high of about 1,000, about 2,000, or about 9,000. For example, the phenol-formaldehyde resin can have a z-average molecular weight from about 250 to about 450, about 450 to about 550, about 550 to about 950, about 950 to about 1,500, about 1,500 to about 3,500, about 3,500 to about 6,500, or about 6,500 to about 9,000. The phenol-formaldehyde resin can also have a z-average molecular weight of about 175 to about 800, about 700 to about 3,330, about 1,100 to about 4,200, about 230 to about 550, about 425 to about 875, or about 4,750 to about 8,500.

According to several exemplary embodiments, the phenol-formaldehyde resin has any suitable viscosity. The phenol-formaldehyde resin can be a solid or liquid at 25° C. For example, the viscosity of the phenol-formaldehyde resin can be from about 1 centipoise (cP), about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the phenol-formaldehyde resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the phenol-formaldehyde resin can have a viscosity from about 1 cP to about 45 cP, about 45 cP to about 125, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the phenol-formaldehyde resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the phenol-formaldehyde resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C. The viscosity of the phenol-formaldehyde resin can be determined using a Brookfield viscometer.

According to several exemplary embodiments, the phenol-formaldehyde resin can have pH from a low of about 1, about 2, about 3, about 4, about 5, about 6, about 7 to a high of about 8, about 9, about 10, about 11, about 12, or about 13. For example, the phenol-formaldehyde resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments of the present invention, the amphiphilic coating applied to the proppant particles is an epoxy resin. According to such embodiments, the amphiphilic coating can be or include any suitable epoxy resin. For example, the epoxy resin can include bisphenol A, bisphenol F, aliphatic, or glycidylamine epoxy resins, and any mixtures or combinations thereof. An example of a commercially available epoxy resin is BE188 Epoxy Resin, available from Chang Chun Plastics Co., Ltd.

According to several exemplary embodiments, the epoxy resin can have any suitable viscosity. The epoxy resin can be a solid or liquid at 25° C. For example, the viscosity of the epoxy resin can be from about 1 cP, about 100 cP, about 250 cP, about 500 cP, or about 700 cP to about 1,000 cP, about 1,250 cP, about 1,500 cP, about 2,000 cP, or about 2,200 cP at a temperature of about 25° C. In another example, the epoxy resin can have a viscosity from about 1 cP to about 125 cP, about 125 cP to about 275 cP, about 275 cP to about 525 cP, about 525 cP to about 725 cP, about 725 cP to about 1,100 cP, about 1,100 cP to about 1,600 cP, about 1,600 cP to about 1,900 cP, or about 1,900 cP to about 2,200 cP at a temperature of about 25° C. In another example, the epoxy resin can have a viscosity from about 1 cP to about 45 cP, about 45 cP to about 125 cP, about 125 cP to about 550 cP, about 550 cP to about 825 cP, about 825 cP to about 1,100 cP, about 1,100 cP to about 1,600 cP, or about 1,600 cP to about 2,200 cP at a temperature of about 25° C. The viscosity of the epoxy resin can also be from about 500 cP, about 1,000 cP, about 2,500 cP, about 5,000 cP, or about 7,000 cP to about 10,000 cP, about 12,500 cP, about 15,000 cP, about 17,000 cP, or about 20,000 cP at a temperature of about 25° C. In another example, the epoxy resin can have a viscosity from about 1,000 cP to about 12,000 cP, about 2,000 cP to about 11,000 cP, about 4,000 cP to about 10,500 cP, or about 7,500 cP to about 9,500 cP at a temperature of about 25° C. The viscosity of the epoxy resin can also be from about 500 cP, about 1,000 cP, about 2,500 cP, about 5,000 cP, or about 7,500 cP to about 10,000 cP, about 15,000 cP, about 20,000 cP, about 30,000 cP, or about 75,000 cP at a temperature of about 150° C. For example, the epoxy resin can have a viscosity from about 750 cP to about 60,000 cP, about 1,000 cP to about 35,000 cP, about 4,000 cP to about 25,000 cP, about 8,000 cP to about 16,000 cP, or about 10,000 cP to about 12,000 cP at a temperature of about 150° C.

According to several exemplary embodiments, the epoxy resin can have pH from a low of about 1, about 2, about 3, about 4, about 5, about 6, about 7 to a high of about 8, about 9, about 10, about 11, about 12, or about 13. For example, the epoxy resin can have a pH from about 1 to about 2.5, about 2.5 to about 3.5, about 3.5 to about 4.5, about 4.5 to about 5.5, about 5.5 to about 6.5, about 6.5 to about 7.5, about 7.5 to about 8.5, about 8.5 to about 9.5, about 9.5 to about 10.5, about 10.5 to about 11.5, about 11.5 to about 12.5, or about 12.5 to about 13.

According to several exemplary embodiments, the amphiphilic coating can be or include any one or more wetting agents. According to several exemplary embodiments, the wetting agent is capable of being coated onto a proppant particle. Specific examples of wetting agents can include, but are not limited to, alkyl sulfonates, alkyl aryl sulfonates including alkyl benzyl sulfonates such as salts of dodecylbenzene sulfonic acid, alkyl trimethylammonium chloride, branched alkyl ethoxylated alcohols, phenol-formaldehyde nonionic resin blends, cocobetaines, dioctyl sodium sulfosuccinate, imidazolines, alpha olefin sulfonates, linear alkyl ethoxylated alcohols, trialkyl benzylammonium chloride, polyaminated fatty acids, and the like. In one or more exemplary embodiments, the wetting agent can be or include cocoamidopropyl hydroxysultaine, cocoamidopropyl betaine, ethoxylated lauryl alcohol, ethoxylated tridecyl alcohol, ethoxylated C9-C11 alcohols, ethoxylated C11-C13 alcohols, polyethylene glycol, laurylamidopropyl betaine, Dioctosulfosuccinate, alkoxylated linear alcohol, ethoxylated castor oil, polysorbate, or glycerol monolaurate or any combination thereof.

The amphiphilic material can have any suitable degree of water wettability and/or oil wettability. In one or more exemplary embodiments, the outer surface of the amphiphilic material has a water wettability value as measured by a water droplet contact angle of less than 90°, less than 80°, less than 70°, less than 60°, less than 50°, or about 45° or less. In one or more exemplary embodiments, the outer surface of the amphiphilic material has an oil wettability value as measured by an oil droplet contact angle of less than 90°, less than 80°, less than 70°, less than 60°, less than 50°, or about 45° or less.

The lightweight proppant can include any suitable concentration of the amphiphilic material. In one or more exemplary embodiments, the lightweight proppant has an amphiphilic material concentration of at least about 0.05 wt %, at least about 0.1 wt %, at least about 0.5 wt %, at least about 1 wt %, at least about 1.5 wt %, at least about 2 wt %, or at least about 2.5 wt %, based on the weight of the lightweight proppant particle. In one or more exemplary embodiments, the lightweight proppant has a hydrophobic material concentration of less than 10 wt %, less than 8 wt %, less than 6 wt %, less than 4 wt %, or less than 3 wt %, based on the weight of the lightweight proppant particle. The lightweight proppant can have an amphiphilic material concentration from about 0.08 wt %, about 0.12 wt %, about 0.25 wt %, about 0.75 wt %, about 1.25 wt %, or about 1.75 wt % to about 2 wt %, about 2.25 wt %, about 2.5 wt %, about 2.75 wt %, about 3 wt %, about 3.5 wt %, or about 5 wt % or more based on the weight of the lightweight proppant particle.

The proppant particle can be selected from the group of ceramic proppant, sand, plastic beads and glass beads. In one or more exemplary embodiments, the proppant particle can be or include natural sand. In one or more exemplary embodiments, the proppant particle can be or include ceramic proppant. The ceramic proppant can be or include porous ceramic proppant and non-porous ceramic proppant. Such proppant particulates can be manufactured according to any suitable process including, but not limited to continuous spray atomization, spray fluidization, drip casting, spray drying, or compression. Suitable proppant particulates and methods for manufacture are disclosed in U.S. Pat. Nos. 4,068,718, 4,427,068, 4,440,866, 5,188,175, 7,036,591, 8,865,631, 8,883,693, and 9,175,210, and U.S. patent application Ser. Nos. 14/502,483 and 14/802,761, the entire disclosures of which are incorporated herein by reference, the entire disclosures of which are incorporated herein by reference.

The proppant particle can be or include silica and/or alumina in any suitable amounts. According to several exemplary embodiments, the proppant particle includes less than 80 wt %, less than 60 wt %, less than 40 wt %, less than 30 wt %, less than 20 wt %, less than 10 wt %, or less than 5 wt % silica based on the total weight of the proppant particle. According to several exemplary embodiments, the proppant particle includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the proppant particle includes at least about 30 wt %, at least about 50 wt %, at least about 60 wt %, at least about 70 wt %, at least about 80 wt %, at least about 90 wt %, or at least about 95 wt % alumina based on the total weight of the proppant particle. According to several exemplary embodiments, the proppant particle includes from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

According to several exemplary embodiments, the proppant compositions disclosed herein include proppant particles that are substantially round and spherical having a size in a range between about 6 and 270 U.S. Mesh. For example, the size of the proppant particle can be expressed as a grain fineness number (GFN) in a range of from about 15 to about 300, or from about 30 to about 110, or from about 40 to about 70. According to such examples, a sample of proppant particles can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

The proppant particles can have any suitable size. For example, the proppant particle can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the proppant particle has a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the proppant particle has a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the proppant compositions disclosed herein include porous and/or non-porous proppant particles having any suitable permeability and conductivity in accordance with ISO 13503-5: "Procedures for Measuring the Long-term Conductivity of Proppants," and expressed in terms of Darcy units, or Darcies (D). A pack of the proppant particles, having a 20/40 mesh size range, can have a long term permeability at 7,500 psi of at least about 1 D, at least about 2 D, at least about 5 D, at least about 10 D, at least about 20 D, at least about 40 D, at least about 80 D, at least about 120 D, at least about 150 D, at least about 200 D, or at least about 250 D. The pack of the proppant particles, having a 20/40 mesh size range, can have a long term permeability at 12,000 psi of at least about 1 D, at least about 2 D, at least about 3 D, at least about 4 D, at least about 5 D, at least about 10 D, at least about 25 D, at least about 50 D, at least about 100 D, at least about 150 D, or at least about 200 D. The pack of the proppant particles, having a 20/40 mesh size range, can have a long term permeability at 15,000 psi of at least about 1 D, at least about 2 D, at least about 3 D, at least about 4 D, at least about 5 D, at least about 10 D, at least about 25 D, at least about 50 D, at least about 75 D, at least about 100 D, or at least about 150 D. The pack of the proppant particles, having a 20/40 mesh size range, can have a long term permeability at 20,000 psi of at least about 1 D, at least about 2 D, at least about 3 D, at least about 4 D, at least about 5 D, at least about 10 D, at least about 25 D, at least about 50 D, at least about 75 D, or at least about 100 D.

A pack of the proppant particles can have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, a pack of the proppant particles can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

The proppant compositions disclosed herein include proppant particles having any suitable shape. The proppant particles can be substantially round, cylindrical, square, rectangular, elliptical, oval, egg-shaped, or pill-shaped. In one or more exemplary embodiments, the proppant particles are substantially round and spherical.

The proppant particles can have any suitable apparent specific gravity. As used herein, the term "apparent specific gravity" refers to the weight per unit volume (grams per cubic centimeter) of an object, wherein the volume of the object is the volume of water displaced by submerging the object in water. The proppant particles can have an apparent specific gravity of at least about 1.5 g/cc, at least about 1.7 g/cc, at least about 1.9 g/cc, at least about 2.1 g/cc, at least about 2.3 g/cc, at least about 2.5 g/cc, at least about 2.7 g/cc, at least about 3 g/cc, at least about 3.3 g/cc, or at least about 3.5 g/cc. In one or more exemplary embodiments, the proppant particles can have an apparent specific gravity of less than 4 g/cc, less than 3.5 g/cc, less than 3 g/cc, less than 2.75 g/cc, less than 2.5 g/cc, or less than 2.25 g/cc. For example, the proppant particles can have an apparent specific gravity of about 1.6 g/cc to about 3.5 g/cc, about 1.8 g/cc to about 3.2 g/cc, about 2.0 g/cc to about 2.7 g/cc, about 2.1 g/cc to about 2.4 g/cc, or about 2.2 g/cc to about 2.6 g/cc.

The proppant particles can have any suitable bulk density. As used herein, the term "bulk density" refers to the weight per unit volume (grams per cubic centimeter) of a plurality of objects including the void spaces between the particles in the volume considered. In one or more exemplary embodiments, the proppant particles have a bulk density of less than 3 g/cc, less than 2.5 g/cc, less than 2.2 g/cc, less than 2 g/cc, less than 1.8 g/cc, less than 1.6 g/cc, or less than 1.5 g/cc. The proppant particles can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the proppant particles can have a bulk density of about 1.3 g/cc to about 1.8 g/cc, about 1.35 g/cc to about 1.65 g/cc, or about 1.5 g/cc to about 1.9 g/cc.

The proppant particles can have any suitable surface roughness. The proppant particles can have a surface roughness of less than 5 μm, less than 4 μm, less than 3 μm, less than 2.5 μm, less than 2 μm, less than 1.5 μm, or less than 1 μm. For example, the proppant particles can have a surface roughness of about 0.1 μm to about 4.5 μm, about 0.4 μm to about 3.5 μm, or about 0.8 μm to about 2.8 μm.

The proppant particles can have any suitable porosity. According to several exemplary embodiments, the proppant particles can be or include porous ceramic proppant having any suitable porosity. The porous ceramic proppant can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous ceramic proppant is from about 5% to about 75%, about 5% to about 15%, about 10% to about 30%, about 15% to about 35%, about 25% to about 45%, about 30% to about 55%, or about 35% to about 70%. According to several exemplary embodiments, the porous ceramic proppant can have any suitable average pore size. For example, the porous ceramic proppant can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous ceramic proppant can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

The hydrophobic material can be added to the proppant particulate in any suitable manner. In one or more exemplary embodiments, the proppant particulate can be treated with the hydrophobic material by coating the hydrophobic material on at least a portion of the outer surface of the proppant particulate. The hydrophobic material can cover at least about 10%, at least about 20%, at least about 35%, at least about 50%, at least about 65%, at least about 75%, at least about 85%, or at least about 95% of the outer surfaces of the proppant particle. The hydrophobic material can cover, for example, 100% of the outer surfaces of the proppant particle.

In one or more exemplary embodiments, the hydrophobic material can cover less than 100%, less than 99%, less than 95%, less than 90%, less than 85%, less than 80%, less than 75%, less than 65%, less than 50%, less than 40%, or less than 35% of the outer surfaces of the proppant particle. In one or more exemplary embodiments, about 25%, about 30%, about 35%, or about 45% to about 55%, about 65%, about 75%, about 85%, about 90%, about 95%, or about 99% or more of the outer surface of the proppant particle can be covered by the hydrophobic material. For example, the hydrophobic material can cover from about 10% to about 99%, from about 15% to about 95%, from about 20% to about 75%, from about 25% to about 65%, from about 30% to about 45%, from about 35% to about 75%, from about 45% to about 90%, or from about 40% to about 95% of the outer surface of the proppant particle.

In one or more exemplary embodiments, the proppant particulate can be treated with the hydrophobic material by infusing the hydrophobic material into one or more pores and/or one or more channels of the proppant particulate. In one or more exemplary embodiments, the proppant particulate can be treated with the hydrophobic material by coating the hydrophobic material onto the one or more pores and/or one or more channels of the proppant particulate. For example, the hydrophobic material can be applied as a coating on the walls of pores and channels contained in the internal porous structure, also referred to herein as "pore walls."

In one or more exemplary embodiments, the coating of the hydrophobic material can cover at least 0.1%, at least about 1%, at least about 2%, at least about 5%, at least about 7%, at least at least about 10%, at least about 20%, at least about 35%, at least about 50%, at least about 65%, at least about 75%, at least about 85%, or at least about 95% of the outer surfaces of the pore walls. The hydrophobic material can cover, for example, 100% of the outer surfaces of the pore walls of the proppant particle.

In one or more exemplary embodiments, the coating of the hydrophobic material can cover less than 100%, less than 99%, less than 95%, less than 90%, less than 85%, less than 80%, less than 75%, less than 65%, less than 50%, less than 40%, or less than 35% of the outer surfaces of the pore walls. In one or more exemplary embodiments, about 25%, about 30%, about 35%, or about 45% to about 55%, about 65%, about 75%, about 85%, about 90%, about 95%, or about 99% or more of the outer surface of the pore walls can be covered by the hydrophobic material. For example, the coating of hydrophobic material can cover from about 10% to about 99%, from about 15% to about 95%, from about 20% to about 75%, from about 25% to about 65%, from about 30% to about 45%, from about 35% to about 75%, from about 45% to about 90%, or from about 40% to about 95% of the outer surface of the pore walls.

In one or more exemplary embodiments, at least a portion of pores and/or channels of the internal porous structure of the proppant particulate located at or near the surface of the proppant particulate can be coated with the hydrophobic material. For example, the coating of the hydrophobic material can cover at least 10%, at least about 20%, at least about 30%, at least about 50%, at least about 70%, at least about 90%, or at least about 95% of the outer surfaces of the pore walls located at or near the surface of the proppant particulate. In one or more exemplary embodiments, the coating of the hydrophobic material covers at least 10%, at least about 20%, at least about 30%, at least about 50%, at least about 70%, at least about 90%, or at least about 95% of the outer surfaces of the pore walls located at or near the surface of the proppant particulate and less than 50%, less than 30%, less than 20%, less than 15%, less than 10%, less than 5%, or less than 1% of the pore walls not located at or near the surface of the proppant particulate. In one or more exemplary embodiments, only the pores and/or channels of the internal porous structure of the proppant particulate located at or near the surface of the proppant particulate are coated with the hydrophobic material.

The hydrophobic coating can have any suitable thickness. In one or more exemplary embodiments, the hydrophobic coating has an average thickness ranging from about 1 nm, about 5 nm, about 10 nm, about 25 nm, about 50 nm, about 100 nm, or about 200 nm to about 300 nm, about 400 nm, about 500 nm, about 750 nm, about 1,000 nm, or about 5,000 nm or more. For example, the average thickness of the hydrophobic coating can be less than 1,000 nm, less than 500 nm, less than 300 nm, less than 250 nm, less than 200 nm, or less than 100 nm.

The proppant particle having the hydrophobic material, or hydrophobic proppant, can be coated with the amphiphilic material to provide the lightweight proppant. For example, the lightweight proppant can have a hydrophobic layer disposed between the amphiphilic material and the proppant particle. The coating of the amphiphilic material can cover at least about 10%, at least about 15%, at least about 20%, at least about 30%, at least about 40%, or at least about 50% of the outer surfaces of the hydrophobic proppant particle. In one or more exemplary embodiments, the coating of the amphiphilic material can cover less than 100%, less than 99%, less than 95%, less than 90%, less than 85%, less than 80%, less than 75%, less than 65%, less than 50%, less than 40%, or less than 35% of the outer surfaces of the hydrophobic proppant particle. In one or more exemplary embodiments, about 25%, about 30%, about 35%, or about 45% to about 55%, about 65%, about 75%, about 85%, about 90%, about 95%, or about 99% or more of the outer surface of the hydrophobic proppant particle can be covered by the amphiphilic material. For example, the coating of amphiphilic material can cover from about 10% to about 99%, from about 15% to about 95%, from about 20% to about 75%, from about 25% to about 65%, from about 30% to about 45%, from about 35% to about 75%, from about 45% to about 90%, or from about 40% to about 95% of the outer surface of the hydrophobic proppant particle.

The amphiphilic coating of the lightweight proppant can have any suitable thickness. In one or more exemplary embodiments, the amphiphilic coating has an average thickness ranging from about 1 nm, about 5 nm, about 10 nm, about 25 nm, about 50 nm, about 100 nm, about 250 nm, about 500 nm, about 1,000 nm, or about 2,000 nm to about 3,000 nm, about 4,000 nm, about 5,000 nm, about 7,500 nm, about 10,000 about 15,000 nm, about 20,000 nm, or about 30,000 nm or more. For example, the average thickness of the amphiphilic coating can be less than 30,000 nm, less than 25,000 nm, less than 20,000 nm, less than 15,000 nm, less than 10,000 nm, or less than 5,000 nm.

The lightweight proppant can have any suitable bulk density. In one or more exemplary embodiments, the lightweight proppant can have a bulk density of at least about 0.8 g/cc, at least about 1 g/cc, at least about 1.5 g/cc, at least about 1.8 g/cc, at least about 2 g/cc, at least about 2.2 g/cc, or at least about 2.4 g/cc. The lightweight proppant can have a bulk density of about 1.15 g/cc, about 1.25 g/cc, about 1.35 g/cc, or about 1.45 g/cc to about 1.5 g/cc, about 1.6 g/cc, about 1.75 g/cc, about 1.9 g/cc, about 2.1 g/cc, or about 2.5 g/cc or more. For example, the lightweight proppant can have a bulk density of about 1.3 g/cc to about 1.8 g/cc, about 1.35 g/cc to about 1.65 g/cc, about 1.5 g/cc to about 1.9 g/cc, or about 1.6 g/cc to about 2.1 g/cc. In one or more exemplary embodiments, the lightweight proppant has a bulk density less than the bulk density of the proppant particle.

The lightweight proppant can have any suitable apparent specific gravity. In one or more exemplary embodiments, the lightweight proppant can have an apparent specific gravity less than 3 g/cc, less than 2.8 g/cc, less than 2.5 g/cc, less than 2.2 g/cc, less than 2 g/cc, less than 1.8 g/cc, or less than 1.6 g/cc. The lightweight proppant can have an apparent specific gravity of about 1.25 g/cc, about 1.45 g/cc, about 1.65 g/cc, or about 1.85 g/cc to about 1.95 g/cc, about 2 g/cc, about 2.1 g/cc, about 2.2 g/cc, or about 2.4 g/cc or more. For example, the lightweight proppant can have an apparent specific gravity of about 1.5 g/cc to about 2.5 g/cc, about 1.65 g/cc to about 2.25 g/cc, about 1.4 g/cc to about 1.8 g/cc, or about 1.8 g/cc to about 2.1 g/cc. In one or more exemplary embodiments, the lightweight proppant has an apparent specific gravity less than the apparent specific gravity of the proppant particle. The apparent specific gravity of the lightweight proppant can be less than 95%, less than 90%, less than 85%, less than 80%, less than 75%, or less than 70% of the apparent specific gravity of the proppant particle.

The lightweight proppant can have any suitable degree of water wettability and/or oil wettability. In one or more exemplary embodiments, the outer surface of the lightweight proppant has a water wettability value as measured by a water droplet contact angle of less than 90°, less than 80°, less than 70°, less than 60°, less than 50°, or about 45° or less. In one or more exemplary embodiments, the outer surface of the lightweight proppant has an oil wettability value as measured by an oil droplet contact angle of less than 90°, less than 80°, less than 70°, less than 60°, less than 50°, or about 45° or less.

The lightweight proppant disclosed herein can be selectively impermeable to aqueous based solutions. In one or more exemplary embodiments, the hydrophobic treatment can prevent water or any other suitable aqueous based solutions, such as hydraulic fracturing fluids, from entering and/or saturating the internal porosity of the proppant particles, while maintaining open fluid permeability of the internal porosity to gaseous compositions, such as air. In one or more exemplary embodiments, the hydrophobic treatment can prevent water or any other suitable aqueous based solutions, such as hydraulic fracturing fluids, from entering and/or saturating the internal porosity of the proppant particles, while maintaining open fluid permeability of the internal porosity to organic phase solutions, such as produced hydrocarbon liquids, and gaseous compositions, such as air.

The lightweight proppant can be prepared in any suitable manner. For example, the lightweight proppant can be prepared by treating bare or raw proppant particles with the hydrophobic material to provide hydrophobic proppant particles. In treating the lightweight proppant with the hydrophobic material, the hydrophobic material can be coated onto pore walls of the proppant particles. In one or more exemplary embodiments, hydrophobic material can be coated onto pore walls located at or near the proppant surface. The hydrophobic proppant particles can then be coated with the amphiphilic material to provide the lightweight proppant.

The proppant particles can be treated with the hydrophobic material by coating the hydrophobic material on and/or infusing the hydrophobic material into the proppant particles in any suitable manner to provide the hydrophobic proppant particles. Suitable methods for treating proppant particles with hydrophobic material to provide the hydrophobic proppant particles include methods disclosed in U.S. Pat. No. 2,378,817 to Wrightsman, U.S. Pat. No. 4,873,145 to Okada and U.S. Pat. No. 4,888,240 to Graham, the entire disclosures of which are incorporated herein by reference. In one or more exemplary embodiments, the hydrophobic material can be coated onto and/or infused into the proppant particles by mixing the proppant particles with the hydrophobic material or a solution containing the hydrophobic material. For example, the proppant particles can be submerged into a solution or bath of the hydrophobic material to provide the hydrophobic proppant particles. In one or more exemplary embodiments, the hydrophobic material can be introduced into the interstitial or porous spaces of the proppant particles with systems and methods selected from the group of microwave blending, vacuum infusion, thermal infusion, capillary action, ribbon blending at room or elevated temperature, and pug mill processing, and any combination thereof.

The amphiphilic material can be coated onto the hydrophobic proppant particle in any suitable manner. The amphiphilic material can be coated on the hydrophobic proppant particle in 1, 2, 3, or 4 or more coatings or coats. Methods for coating proppant particles with resins and/or epoxy resins are well known to those of ordinary skill in the art, for instance see U.S. Pat. No. 2,378,817 to Wrightsman, U.S. Pat. No. 4,873,145 to Okada and U.S. Pat. No. 4,888,240 to Graham, the entire disclosures of which are incorporated herein by reference.

When used as a proppant, the particles described herein can be handled in the same manner as ordinary proppants. For example, the particles can be delivered to the well site in bags or in bulk form along with the other materials used in fracturing treatment. Conventional equipment and techniques can be used to place the particles in the formation as a proppant. For example, the particles are mixed with a fracture fluid, which is then injected into a fracture in the formation.

In an exemplary method of fracturing a subterranean formation, a hydraulic fluid is injected into the formation at a rate and pressure sufficient to open a fracture therein, and a fluid containing the lightweight proppant as described herein and having one or more of the properties as described herein is injected into the fracture to prop the fracture in an open condition. In an exemplary method of gravel packing a wellbore, a hydraulic fluid containing the lightweight proppant as described herein and having one or more of the properties as described herein is injected into the a gravel-pack region of a wellbore under a rate and pressure suitable for placement of the lightweight proppant as a gravel-pack into the gravel-pack region of the wellbore. In an exemplary method of frac-packing a wellbore, a hydraulic fluid containing the lightweight proppant is injected into a frac-pack region of a wellbore at a rate and pressure sufficient to open a fracture in the formation extending from and/or adjacent to the frac-pack region of the wellbore and under a rate and pressure suitable for placement of the lightweight proppant as a frac-pack into the frac-pack region of the wellbore.

The lightweight proppant can be combined with or admixed with standard or conventional proppant such as bare sand or ceramic proppant. In an exemplary method of fracturing a subterranean formation, a hydraulic fluid is injected into the formation at a rate and pressure sufficient to open a fracture therein, and a fluid containing the lightweight is injected into the fracture to prop the fracture in an open condition followed by a tail-in injection of a fluid containing conventional proppant into the fracture. In another exemplary method of fracturing a subterranean formation, a hydraulic fluid is injected into the formation at a rate and pressure sufficient to open a fracture therein, and a fluid containing the conventional proppant is injected into the fracture to prop the fracture in an open condition followed by a tail-in injection of a fluid containing the lightweight proppant. In yet another exemplary method of fracturing a subterranean formation, a hydraulic fluid is injected into the formation at a rate and pressure sufficient to open a fracture therein, and a fluid containing a mixture of the lightweight proppant and the conventional proppant is injected into the fracture to prop the fracture in an open condition.

In another exemplary method of gravel packing a wellbore, a hydraulic fluid containing a mixture of the lightweight proppant and the conventional proppant is injected into a gravel-pack region of a wellbore under a rate and pressure suitable for placement of the lightweight proppant and/or the conventional proppant as a gravel-pack into the gravel-pack region of the wellbore. In another exemplary method of frac-packing a wellbore, a hydraulic fluid containing a mixture of the lightweight proppant and the conventional proppant is injected into a frac-pack region of a wellbore at a rate and pressure sufficient to open a fracture in the formation extending from and/or adjacent to the frac-pack region of the wellbore and under a rate and pressure suitable for placement of the lightweight proppant and/or the conventional proppant as a frac-pack into the frac-pack region of the wellbore.

EXAMPLES

These examples were carried out using exemplary materials in order to determine apparent specific gravity of lightweight proppant having various coating concentrations of hydrophobic material and amphiphilic material. These examples are meant to be illustrative of exemplary embodiments of the present invention and are not intended to be exhaustive.

Example 1

A 1000 gram batch (first batch) of 30/50 CARBO UltraLite, an ultra-lightweight ceramic proppant having an apparent specific gravity of 2.71 and having a porosity of 20-25% that is commercially available from CARBO Ceramics Inc., was weighed out into a mixing bowl.

The first batch of proppant was heated in an oven set to 482° F. (250° C.) for approximately two hours. The heated first batch of proppant was then removed from the oven and allowed to cool until it reached a temperature of between 445-455° F. After the first batch of proppant had cooled to the process temperature, the proppant was coated with a permeable phenolic coating. The first batch of proppant was coated with the permeable phenolic coating in a one-step process with a phenol formaldehyde standard reactivity resin that is commercially available from Plastics Engineering Company under the trade name Plenco 14941.

The coating process started with the addition of 16.73 grams of the phenol formaldehyde resin to the proppant and the resin was allowed to melt and spread over the proppant. Seven seconds after the addition of the phenol formaldehyde resin, 0.8 gram of an adhesion promoter, Silquest A1000, which is commercially available from Momentive Performance Materials, Inc., was added to the batch. Fifteen seconds after the addition of the phenol formaldehyde resin, 5.44 grams of a 40% hexamethylenetetramine (which is also known as and will be referred to herein as "hexamine"), solution, and which is commercially available from The Chemical Company, was added to crosslink and cure the phenol formaldehyde resin and was allowed to mix for 1 minute 15 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute 30 seconds. After this coating procedure, the first proppant batch included 2.0% by weight of the polymeric coating. The apparent specific gravity for this first batch product was 2.52 g/cc.

Example 2

One 750 gram batch (second batch) of 30/50 CARBO UltraLite was weighed out into the mixing bowl. The second batch of proppant was heated in an oven set to 482° F. (250° C.) for approximately two hours. The heated second batch of proppant was then removed from the oven and allowed to cool until it reached a temperature of between 445-455° F. After the proppant particulates had cooled to the process temperature, the proppant was coated with a permeable phenolic coating. The second batch of proppant was coated with the permeable phenolic coating in a one-step process with Plenco 14941.

The coating process started with the addition of 22.8 grams of the phenol formaldehyde resin to the proppant and the resin was allowed to melt and spread over the proppant. Seven seconds after the addition of the phenol formaldehyde resin, 0.8 gram of Silquest A1000 was added to the batch. Fifteen seconds after the addition of the phenol formaldehyde resin, 7.4 grams of a 40% hexamine solution was added to crosslink and cure the phenol formaldehyde resin and was allowed to mix for 1 minute 15 seconds. Finally, 1.2 grams of Chembetaine™ CAS was added and allowed to mix for 1 minute 30 seconds. After the coating procedure, the second proppant batch included 3.5% by weight of the polymeric coating. The apparent specific gravity for this second batch product was 2.38 g/cc.

Example 3

One 742.5 gram batch (third batch) of 30/50 CARBO UltraLite was treated with a hydrophobic chemical, BYK LPD 22287, having a solids content of 100%, which is commercially available from BYK, and was then coated with a permeable phenolic coating in a one-step process as described below.

The third batch of proppant was heated in an oven set to 482° F. (250° C.) for approximately two hours. The heated third batch of proppant was then removed from the oven and allowed to cool until it reached a temperature of between 445-455° F. as monitored by a thermocouple. Once the third proppant batch reached the desired temperature, 7.5 grams of BYK LPD 22287 was added to the third batch to bring the batch weight up to 750 g. The BYK LPD 22287 was allowed to coat the inner channels of the porous substrate for 20 seconds to provide treated proppant, such that the BYK LPD 22287 constituted 1% by weight of the treated proppant. After the proppant particulates were treated with the BYK LPD 22287 chemical, the third batch was then coated with a permeable phenolic coating.

The treated third batch of proppant was coated in a one-step process with Plenco 14941. Immediately after the proppant batch was treated with the hydrophobic chemical, 22.82 grams of the phenol formaldehyde resin was added to the treated proppant and allowed to melt and spread over the proppant. Seven seconds after the addition of the phenol formaldehyde resin, 0.8 gram of Silquest A1000 was added to the batch. Fifteen seconds after the addition of the phenol formaldehyde resin, 7.42 grams of 40% hexamine solution was added to crosslink and cure the phenol formaldehyde resin and was allowed to mix for 1 minute 15 seconds. Finally, 1.2 grams of Chembetaine™ CAS, was added and allowed to mix for 1 minute 30 seconds. After the coating procedure, the third proppant batch included 3.5% by weight of the polymeric coating. The apparent specific gravity for this third batch product was 2.05 g/cc.

Example 4

One 750 gram batch (fourth batch) of 30/50 CARBO UltraLite was treated with BYK LPD 22287 and then coated with a permeable phenolic coating in a two-step process as described below. The fourth batch of proppant was heated in an oven set to 482° F. (250° C.) for approximately one hour. The heated fourth batch of proppant was then removed from the oven and allowed to cool until it reached a temperature of between 450-460° F. as monitored by a thermocouple. Once the fourth proppant batch reached the desired temperature, 7.5 grams of BYK LPD 22287 was added to the batch and allowed to coat the inner channels of the porous substrate for 20 seconds, such that the BYK LPD 22287 constituted 1% by weight of the treated proppant. After the proppant particulates were treated with the BYK LPD 22287 chemical, the batch was coated with a permeable phenolic coating.

The treated fourth batch of proppant was coated in a two-step process according to the following procedure with Plenco 14941. 30 seconds after the proppant batch was treated with the hydrophobic chemical and allowed to mix with the proppant substrate in the bowl, 15.2 grams of the phenol formaldehyde resin was added to the treated proppant and allowed to melt and spread over the proppant. Ten seconds after the first addition of the phenol formaldehyde resin, 0.8 gram of Silquest A1000 was added to the batch. Twenty seconds after the first addition of the phenol formaldehyde resin, 4.94 grams of 40% hexamine solution was added to crosslink and cure the phenol formaldehyde resin and was allowed to mix for 20 seconds. A second addition of phenol formaldehyde was added to the batch 30 seconds after the first addition of the phenol formaldehyde resin at an amount of 7.61 grams. Ten seconds after the second addition of the phenol formaldehyde resin, 2.47 grams of 40% hexamine solution was added to crosslink and cure the remaining phenol formaldehyde resin and was allowed to mix for 1 minute 50 seconds. Finally, 1.2 grams of Chembetaine™ CAS was added and allowed to mix for 30 seconds. After the coating procedure, the fourth proppant batch included 3.5% by weight of the polymeric coating. The apparent specific gravity for this fourth batch product was 1.98 g/cc.

Table 1 below shows a comparison of process routes and final apparent specific gravities (ASG) obtained with each process.

| Process Route | BYK-22287 Infusion (wt %) | Resin Coat (wt %) | Final ASG (g/cc) |
|---|---|---|---|
| Example 1 | NIL | 2.0 | 2.52 |
| Example 2 | NIL | 3.5 | 2.38 |
| Example 3 | 1 | 3.5 | 2.05 |
| Example 4 | 1 | 3.5 | 1.98 |

Example 5

Batches 1A-D and 2A-D of 30/50 CARBO UltraLite were first treated with various amounts of BYK LPD 22287 chemical and then coated with various amounts of phenol-formaldehyde resin coating (Plenco 14941) using the one-step process disclosed in Examples 1-3 above. In particular, Batch 1A was a first sample of 30/50 CARBO UltraLite treated with an amount of BYK LPD 22287 chemical that resulted in a BYK LPD 22287 concentration of 0.25 wt %. Batch 1B was a second sample of 30/50 CARBO UltraLite treated with an amount of BYK LPD 22287 chemical that resulted in a BYK LPD 22287 concentration of 0.5 wt %. Batch 1C was a third sample of 30/50 CARBO UltraLite treated with an amount of BYK LPD 22287 chemical that resulted in a BYK LPD 22287 concentration of 0.75 wt %. Batch 1D was a fourth sample of 30/50 CARBO UltraLite treated with an amount of BYK LPD 22287 chemical that resulted in a BYK LPD 22287 concentration of 1.0 wt %. Batches 1A-D were then coated with a phenol-formaldehyde resin coating (Plenco 14941) using the one-step process disclosed in Example 1 above to provide lightweight proppant samples, each sample having a phenol-formaldehyde resin concentration of 2.0 wt %.

Batch 2A was a fifth sample of 30/50 CARBO UltraLite treated with an amount of BYK LPD 22287 chemical that resulted in a BYK LPD 22287 concentration of 0.25 wt %. Batch 2B was a sixth sample of 30/50 CARBO UltraLite treated with an amount of BYK LPD 22287 chemical that resulted in a BYK LPD 22287 concentration of 0.5 wt %. Batch 2C was a seventh sample of 30/50 CARBO UltraLite treated with an amount of BYK LPD 22287 chemical that resulted in a BYK LPD 22287 concentration of 0.75 wt %. Batch 2D was an eighth sample of 30/50 CARBO UltraLite treated with an amount of BYK LPD 22287 chemical that resulted in a BYK LPD 22287 concentration of 1.0 wt %. Batches 2A-D were then coated with a phenol-formaldehyde resin coating (Plenco 14941) using the one-step process disclosed in Examples 2-3 above to provide lightweight proppant samples, each sample having a phenol-formaldehyde resin concentration of 3.5 wt %.

The Batches 1A-D and 2A-D, the first batch of Example 1 and the second batch of Example 2 were each submerged in water under atmospheric conditions to determine the apparent specific gravity of each sample. The results of this test are depicted in Table 1 below.

TABLE 1

| Batch No. | Siloxane Concentration (wt %) | Apparent Specific Gravity (g/cc) |
|---|---|---|
| 1 (2.0 wt % Resin Coat) | | |
| Control-1 | 0 | 2.52 |
| 1A | 0.25 | 2.018 |
| 1B | 0.5 | 1.989 |
| 1C | 0.75 | 2.024 |
| 1D | 1 | 2.011 |
| 2 (3.5 wt % Resin Coat) | | |
| Control-2 | 0 | 2.38 |
| 2A | 0.25 | 1.991 |
| 2B | 0.5 | 1.982 |
| 2C | 0.75 | 1.975 |
| 2D | 1 | 2.008 |

The Batches 1A-D and 2A-D were then submerged in water and placed a pressure cell where the pressure upon the batches was increased to 2,000 psi for 4 minutes to determine if the proppant would allow water influx under pressure by measuring the apparent specific gravity of each sample under pressure. The results of this test are depicted in Table 2 below. Since no significant change in apparent specific gravity was observed, the results indicated that the application of 2,000 psi did not produce a significant influx of water into the porous ceramic proppant.

TABLE 2

| Batch No. | Siloxane Concentration (wt %) | Apparent Specific Gravity (g/cc) |
|---|---|---|
| 1 (2.0 wt % Resin Coat) | | |
| 1A | 0.25 | 1.945 |
| 1B | 0.5 | 1.940 |
| 1C | 0.75 | 2.384 |
| 1D | 1 | 1.893 |
| 2 (3.5 wt % Resin Coat) | | |
| 2A | 0.25 | 2.150 |
| 2B | 0.5 | 1.980 |
| 2C | 0.75 | 1.891 |
| 2D | 1 | 1.995 |

The foregoing description and embodiments are intended to illustrate the invention without limiting it thereby. It will be understood that various modifications can be made in the invention without departing from the spirit or scope thereof.

What is claimed is:

1. A lightweight proppant particle, comprising:
   a proppant particle having an apparent specific gravity of at least 1.5 g/cc;
   a coating of a hydrophobic material formed on an outer surface of the proppant particle; and
   a coating of an amphiphilic material formed on an outer surface of the coating of the hydrophobic material, wherein the coating of the amphiphilic material has a thickness of at least 10 nm and is permeable to air.

2. The lightweight proppant particle of claim 1, wherein the coating of the amphiphilic material encapsulates the coating of the hydrophobic material.

3. The lightweight proppant particle of claim 1, further comprising an apparent specific gravity of less than 2.5 g/cc.

4. The lightweight proppant particle of claim 1, wherein the proppant particle has an internal interconnected porosity from about 1% to about 75%.

5. The lightweight proppant particle of claim 4, wherein the coating of the hydrophobic material is formed on pore walls of the internal interconnected porosity and the coating of the hydrophobic material is configured to maintain open fluid permeability of the internal interconnected porosity to air.

6. The lightweight proppant particle of claim 1, wherein the hydrophobic material comprises a siloxane.

7. The lightweight proppant particle of claim 1, wherein the amphiphilic material comprises a phenolic resin.

8. The lightweight proppant particle of claim 1, wherein the proppant particle has a size from about 10 mesh to about 120 mesh.

9. The lightweight proppant particle of claim 5, wherein the coating of the hydrophobic material is configured to repel water from the internal interconnected porosity.

10. The lightweight proppant particle of claim 1, wherein an outer surface of the lightweight proppant particle has a water wettability value as measured by a water droplet contact angle of less than 90° and an oil wettability value as measured by an oil droplet contact angle of less than 90°.

11. The lightweight proppant particle of claim 1, wherein the lightweight proppant particle has an apparent specific gravity less than the apparent specific gravity of the proppant particle.

12. The lightweight proppant particle of claim 11, wherein the apparent specific gravity of the lightweight proppant is less than 85% of the apparent specific gravity of the proppant particle.

13. A lightweight proppant pack, comprising:
    a plurality of lightweight proppant particles, each lightweight proppant particle of the plurality of lightweight proppant particles comprising:

a proppant particle having an apparent specific gravity of at least 1.5 g/cc;

a coating of a hydrophobic material formed on an outer surface of the proppant particle; and a coating of an amphiphilic material formed on an outer surface of the coating of the hydrophobic material, wherein the coating of the amphiphilic material has a thickness of at least 10 nm and is permeable to air, wherein the lightweight proppant particle has an apparent specific gravity less than the apparent specific gravity of the proppant particle.

14. The lightweight proppant pack of claim 13, wherein each lightweight proppant particle of the plurality of lightweight proppant particles comprises an apparent specific gravity of less than 2.5 g/cc.

15. The lightweight proppant pack of claim 13, wherein the hydrophobic material comprises a siloxane.

16. The lightweight proppant pack of claim 13, wherein the proppant particle has an internal interconnected porosity from about 1% to about 75% and wherein the coating of the hydrophobic material is formed on pore walls of the internal interconnected porosity.

17. A method of fracturing a subterranean formation, comprising:

injecting a hydraulic fluid into a wellbore extending into the subterranean formation at a rate and pressure sufficient to open a fracture therein;

injecting a plurality of lightweight proppant particles into the fracture, each lightweight proppant particle of the plurality of lightweight proppant particles comprising:

a proppant particle having an apparent specific gravity of at least 1.5 g/cc;

a coating of a hydrophobic material formed on an outer surface of the proppant particle; and a coating of an amphiphilic material formed on an outer surface of the coating of the hydrophobic material, wherein the lightweight proppant particle has an apparent specific gravity less than the apparent specific gravity of the proppant particle, and wherein the coating of the amphiphilic material has a thickness of at least 10 nm and is permeable to air; and forming a proppant pack of the plurality of lightweight particles inside the fracture.

18. The method of claim 17, wherein each lightweight proppant particle of the plurality of lightweight proppant particles comprises an apparent specific gravity of less than 2.5 g/cc.

19. The method of claim 17, wherein the hydrophobic material comprises a siloxane.

20. The method of claim 17, wherein the proppant particle has an internal interconnected porosity from about 1% to about 75% and wherein the coating of the hydrophobic material is formed on pore walls of the internal interconnected porosity.

* * * * *